Figure 2:
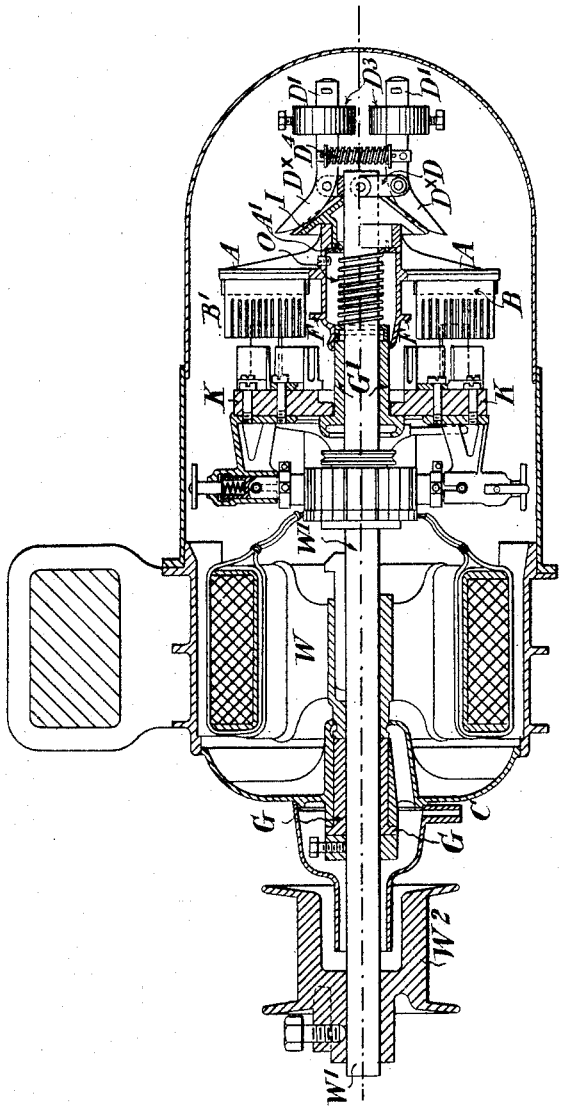

No. 617,121. Patented Jan. 3, 1899.
E. J. PRESTON & A. B. GILL.
APPARATUS FOR ELECTRIC CURRENT SUPPLY, &c.
(Application filed Dec. 29, 1897.)
(No Model.) 5 Sheets—Sheet 1.
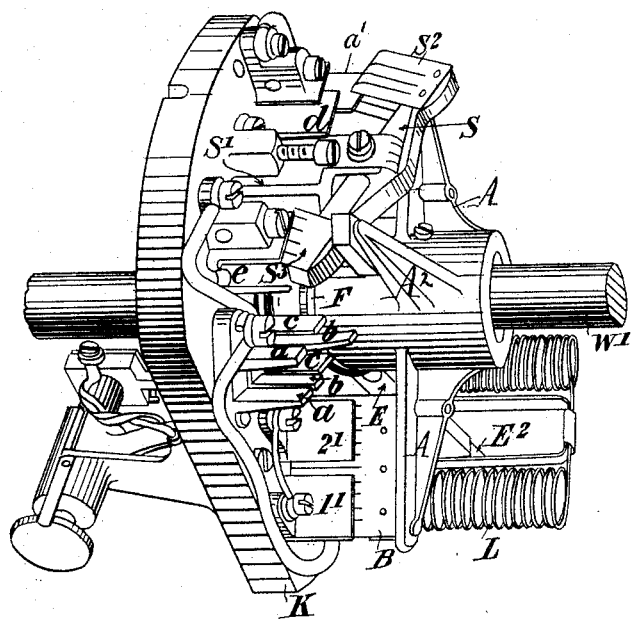
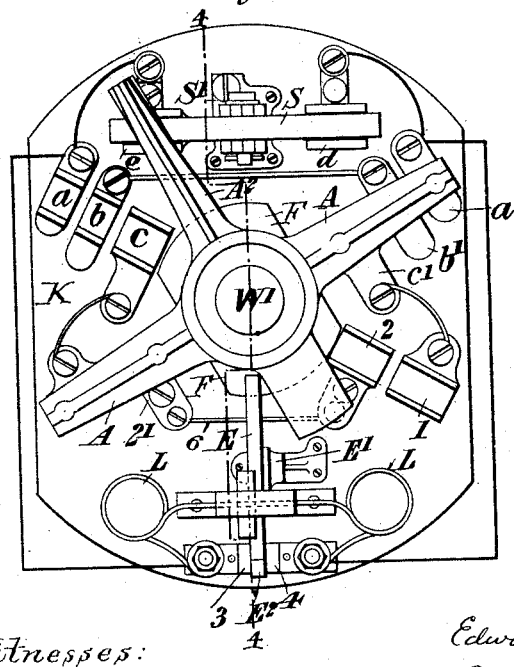
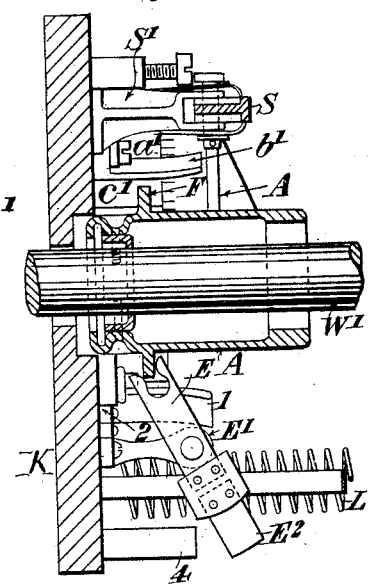
Witnesses:
Henry L. Deck
Chas. F. Burkhart
Inventors:
Edwin James Preston
Arthur Bernard Gill
By Wilhelm Bonner
Attorneys.

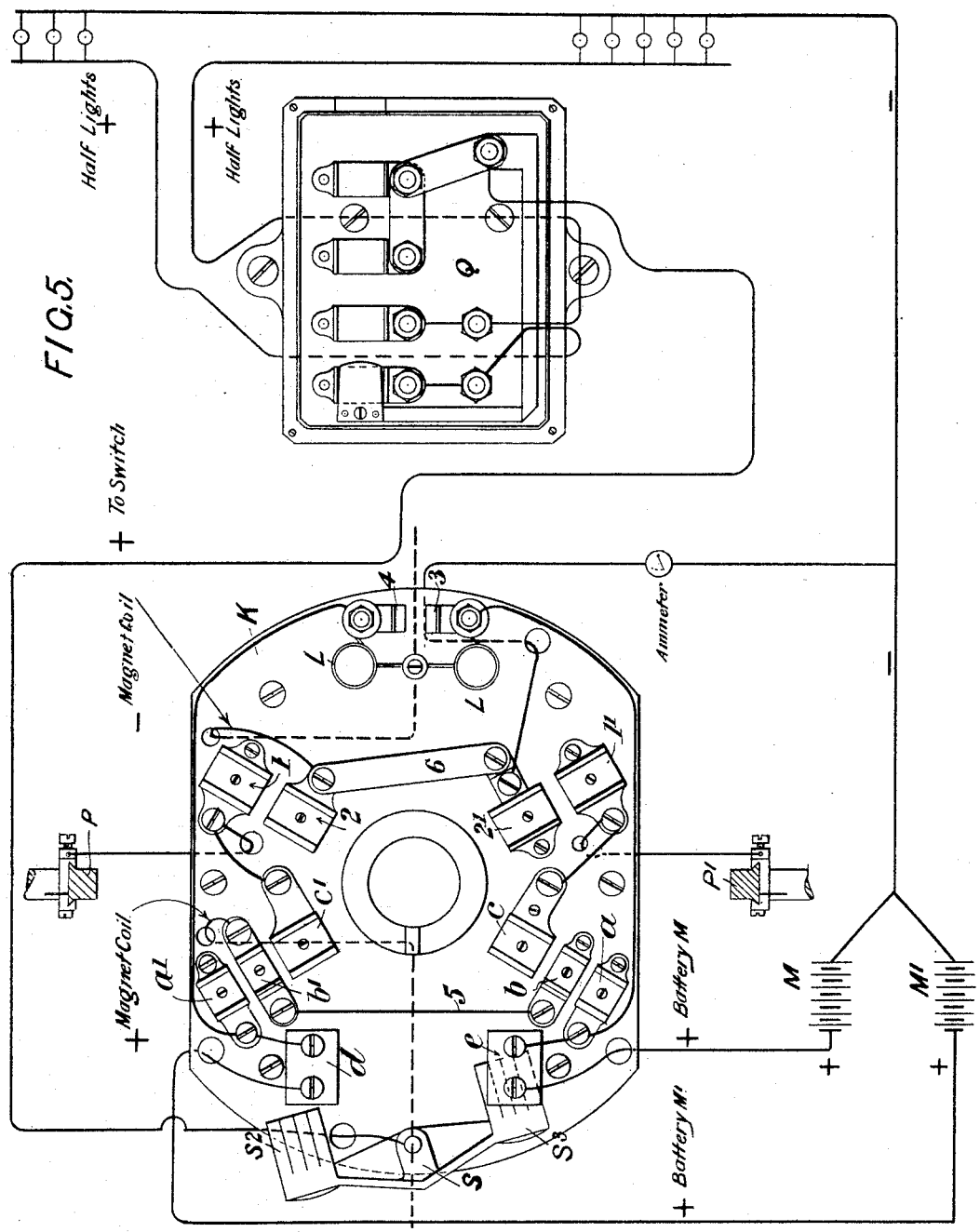

No. 617,121. Patented Jan. 3, 1899.
E. J. PRESTON & A. B. GILL.
APPARATUS FOR ELECTRIC CURRENT SUPPLY, &c.
(Application filed Dec. 29, 1897.)
(No Model.) 5 Sheets—Sheet 4.
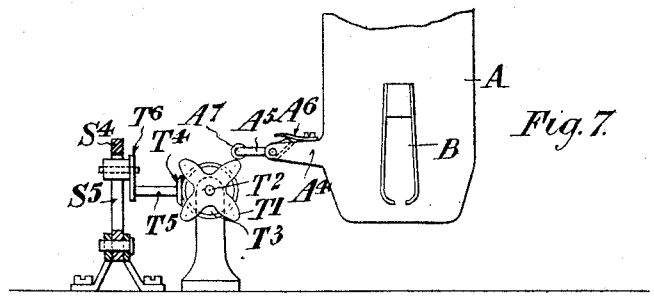
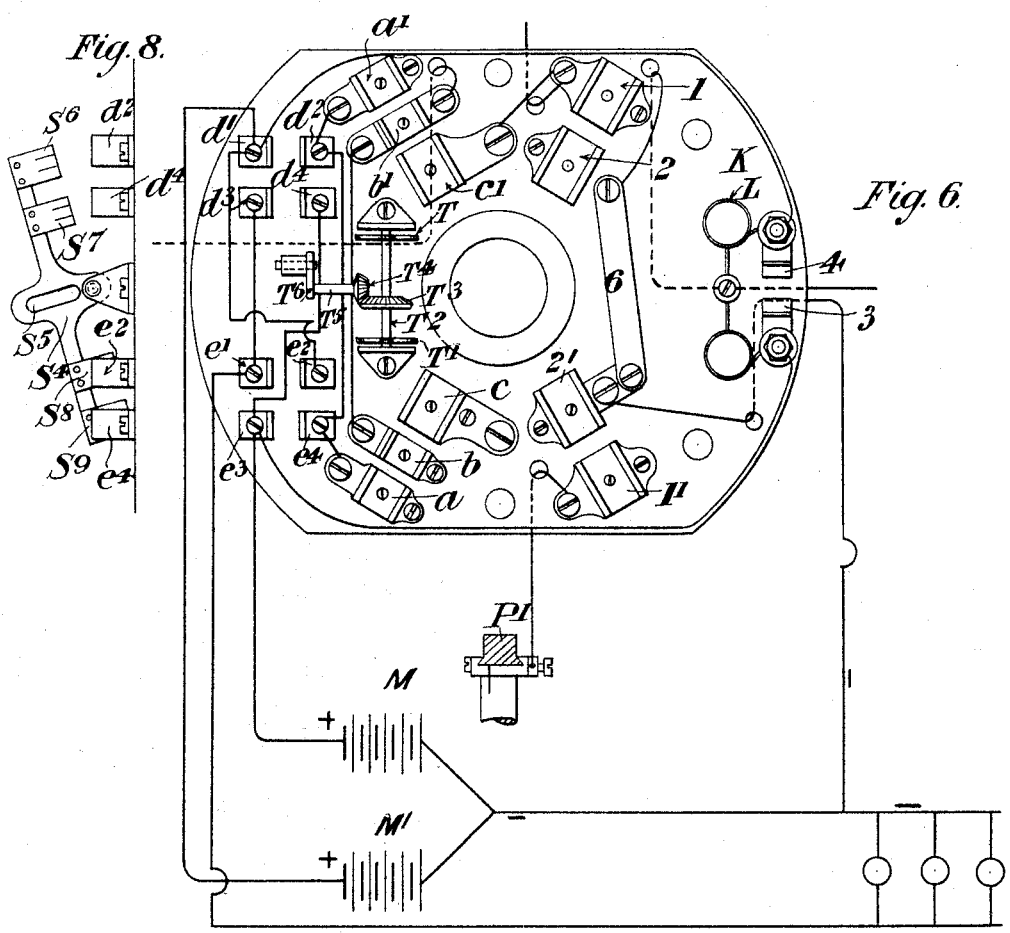
Witnesses.
Henry L. Dick.
Chas. F. Burkhart.
Edwin James Preston
Arthur Bernard Gill Inventors.
By Wilhelm Bonner.
Attorneys.

No. 617,121. Patented Jan. 3, 1899.
E. J. PRESTON & A. B. GILL.
APPARATUS FOR ELECTRIC CURRENT SUPPLY, &c.
(Application filed Dec. 29, 1897.)
(No Model.) 5 Sheets—Sheet 5.
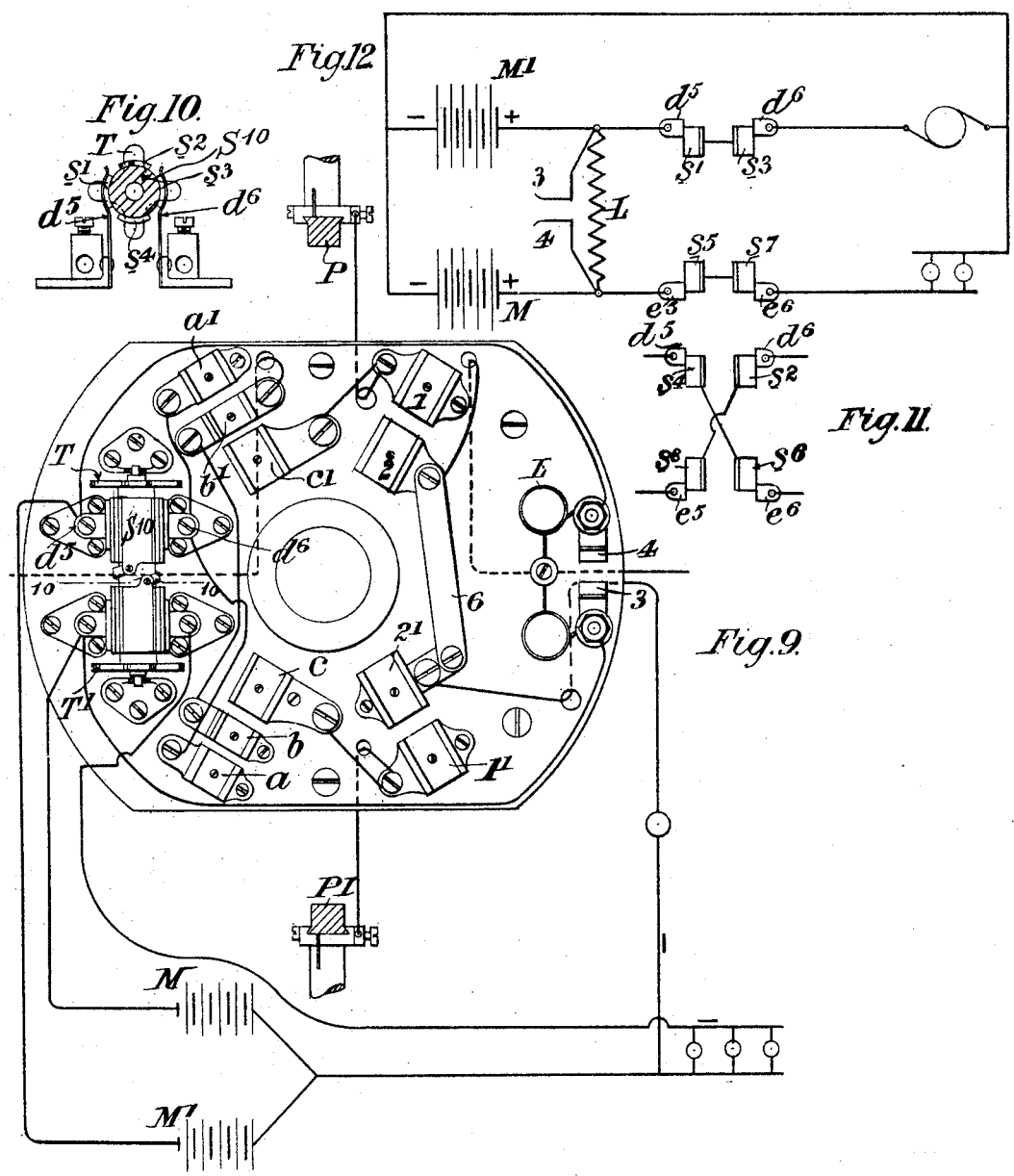
Witnesses:
Henry L. Deck.
Chas. F. Burkhart.
Edwin James Preston
Arthur Bernard Gill Inventors.
By Wilhelm Bonner
Attorneys

UNITED STATES PATENT OFFICE.

EDWIN JAMES PRESTON AND ARTHUR BERNARD GILL, OF LONDON, ENGLAND.

APPARATUS FOR ELECTRIC-CURRENT SUPPLY, &c.

SPECIFICATION forming part of Letters Patent No. 617,121, dated January 3, 1899.

Application filed December 29, 1897. Serial No. 664,250. (No model.)

*To all whom it may concern:*

Be it known that we, EDWIN JAMES PRESTON and ARTHUR BERNARD GILL, subjects of the Queen of Great Britain, residing at Deptford, London, in the county of Kent, England, have invented improvements in apparatus for electric-current supply especially applicable to the lighting and heating of railway-carriages and other vehicles, (for which we have obtained Letters Patent of Great Britain, No. 6,329, dated March 21, 1896,) of which the following is a specification.

Our invention relates more particularly to the lighting and heating of railway-cars by a dynamo which is driven from the car-axle, preferably by an equalizing frictional driving mechanism such as is described and claimed in Letters Patent of the United States No. 602,182, granted to us April 12, 1898.

The object of our present invention is to provide the apparatus with two storage batteries and connect the same with the dynamo and the charging and service circuits by such automatic switching devices that when the dynamo stops and starts again or reverses its motion the battery last in service and which is more or less exhausted is connected with the charging-circuit, while the battery last charged is connected with the service-circuit and the current is reversed to correspond with the reversal of the rotation of the dynamo.

In the accompanying drawings, consisting of five sheets, Figure 1 is a perspective view of the automatic current reversing and switching devices. Fig. 2 is a longitudinal section of a dynamo provided with our improvements. Fig. 3 is a front elevation of the automatic current reversing and switching devices. Fig. 4 is a vertical section in line 4 4, Fig. 3. Fig. 5 is a diagrammatic front elevation illustrating the electrical connecting devices between the dynamo, the batteries, and the lamps or current-receivers. Fig. 6 is a diagrammatic front elevation illustrating the switching devices which are used when two batteries are alternately employed in cases where the motion of the train is not reversed, as in the case of long journeys in one direction or in the case of circular railways. Fig. 7 is a fragmentary top plan view showing the current-switching gear represented in Fig. 6. Fig. 8 is a detail view of the switch-lever shown in Figs. 6 and 7. Fig. 9 is a diagrammatic front elevation illustrating a modified construction of the switching devices used for the last-named purpose. Fig. 10 is a horizontal sectional view in line 10 10, Fig. 9, through the commutator. Fig. 11 is a diagrammatic view showing the commutator connections. Fig. 12 is a diagram representing the last-named electrical connections between the dynamo, the batteries, the commutator for reversing the current, and the lamps or other current-receivers.

Like letters and numerals of reference refer to like parts in the several figures.

The armature of the dynamo W, as shown in Figs. 1, 2, and 3, is fixed on the shaft W', which runs in the bearing-bush G, Fig. 2, fixed in the casing C, that is attached to the field-magnets. This casing is preferably suspended from the car or other vehicle and the dynamo driven from one of the axles, as fully described in our United States Letters Patent above mentioned.

A is a double-armed rocking contact-lever or automatic current-reverser, the nave or hub of which is capable of rocking on the hub of a cam-disk I, Fig. 2, that is free to slide on the dynamo-shaft W', and by the disk A', connected to the hub of the lever A, so as to carry the latter with it when sliding. This lever A is provided with insulated spring-plugs B and B', which are capable of being inserted in one set or other of the contacts *a b c* 1 2 or *a' b' c'* 1' 2', (best seen in Fig. 3,) these contacts being fixed on the insulating-switchboard K, which is mounted on the framing of the dynamo. The lever A will by reason of friction with the hub of the cam-disk I and with the bearing-bush G' on the shaft W' follow the direction of rotation of the shaft W' until it is arrested by stops provided in connection with or forming part of the aforesaid contacts on the board K. It will be noticed on Figs. 1 and 2 that one of the said contacts in each set is longer than the other, and thus forms a stop to limit the rocking or angle of rotation of the current-reversing lever A. Thereupon as the speed of the train increases the plugs B B' are pushed home into the contacts by the operation of the governor, as shall now be described. On the dynamo-shaft W' is fixed the head D of a centrifugal governor, which, as an example, may be of the form shown, its two arms D' being jointed to the head D and provided with coil-springs D$^4$, which partially counteract the centrifugal effort of the weights D$^3$. The other ends D$^×$ of the levers D act against the cam-disk I, which is adapted to slide longitudinally on the shaft W' and transmits a corresponding sliding motion to the lever A, or instead of the cam-disk we may use other forms of sliding sleeve operating in connection with the governor and the lever A.

O is a spring which tends to push the lever A away from the contact-board K.

E, Figs. 1, 3, and 4, is a lever used for inserting a resistance L between the dynamo and the lamps or other current-receivers when the dynamo is running at its normal speed. The lever is mounted on the bracket E' on the board K. One forked end of this lever engages with the flange F on the hub of the lever A, and the other end carries an insulated contact-piece E$^2$.

In our Patent No. 602,182, dated April 12, 1898, we have described such current-reversing devices in connection with one accumulator-battery; but we will now describe it in connection with two accumulator-batteries. In this case the contacts and circuits are so arranged that when the train is running in one direction one battery is being charged while the other is supplying current, and when the train is running in the opposite direction their respective functions are reversed, so that the battery which was being charged is now supplying current, and vice versa. For this purpose a double-armed or "seesaw" switch-lever S, Figs. 3, 4, and 5, is provided, having its fulcrum-bracket S' on the board K and having at each end a contact-maker, (marked, respectively, S$^2$ and S$^3$,) which can be inserted in either a contact $d$ or a contact $e$, according to the position of the lever A—that is to say, according to the direction the train is running—and thereby when the direction is changed automatically switching in one battery or the other. This switch-lever S is actuated, one arm of it or the other being then depressed, by an arm A$^2$ on the current-reversing lever A. The batteries M and M' are, however, never entirely disconnected; but the aforesaid resistance L is provided, through which current may pass from one to the other, this resistance being short-circuited by means of the small pivoted lever E, Figs. 1, 3, and 4, when the train is at a standstill or if the dynamo from any other reason should not be working. Thus a part of the current generated by the dynamo will go to charge that accumulator which is not in direct communication with the lamps, while the other part passes through the resistance L to the lamps, and, if these are not alight, to the other battery. This resistance is so proportioned that when the dynamo is producing the maximum amount of current only sufficient current passes through the resistance to supply the lamps.

Assuming that the dynamo is running in the direction opposite to that of clock-hands, then as soon as sufficient speed has been attained the contact-plugs B B' on the current-reversing lever A will first connect the contacts $a'$ and $b'$, thus magnetizing the field-magnets, the current flowing from the positive pole of battery M' through $a'$ and $b'$ to the positive magnet-coil, returning through the copper strip 6 and contact $a'$ to the common negative wire and to the two accumulators M and M'. The spring-plugs B B' on the reversing-lever A being now pushed in farther, owing to the increased speed of the train and of the dynamo, the other contacts are made as follows: The top brush P (which while the dynamo runs in this direction is positive) is through $c'$ connected to $b'$ and $a'$, a portion passing from $b'$ to the magnet-coil and the remainder passing to $a'$, where it divides, a portion passing through contact $d$ to battery M' and the other portion through L $e$ and lever S to the lamps, or, if these are not alight, from $e$ through M, returning by the common negative wire to the bottom brush P'. When the train and dynamo run in the opposite direction, these connections are reversed, so that the plugs B B' of the current-reverser A will enter the contacts 1 2 and $a, b$, and $c$. When the dynamo is running in the direction first named, the arm A$^2$ on the current-reverser A will, when the plugs B B' are pushed into the contacts, depress one arm of the switch-lever S into the contact $e$, the current passing as above described; but when the dynamo runs in the opposite direction and the current-reverser A is carried over opposite the other set of contacts the arm A$^2$ will, when the plugs B B' of the current-reverser A are inserted into the contacts, depress the other end of the switch-lever S into the contact $d$. This switch is in the diagram Fig. 5 shown horizontally for the sake of clearness; but Figs. 1, 3, and 4 show it in its actual position. The charging connections will then be as follows: Assuming that the dynamo is running in the direction of clock-hands, the plugs B B' on the current-reverser A will first connect $a$ and $b$, thus magnetizing the field-magnets, the current flowing from the positive pole of the battery M through $e$ to A and to $b$, connection 5 and contact $b'$ to the positive end of the magnet coil, returning through the copper strip 6 and contact 2' to the common negative wire and to the batteries M M'. The plugs B B' being next by reason of increase of speed pushed home in their contacts the other contacts are made as follows: The bottom brush P' (which while the dynamo is running in this direction is positive) is through contact $c$ connected to $b$ and $a$, a portion passing from $b$ to the magnet-coil, the remainder passing to $a$, where the current divides, a portion passing through the contact $e$ to the positive pole of the battery M and the other portion through S to the lamps, or, if these are not alight, from contact $e$ through resistance L and battery M', returning by the common negative wire to the negative brush P.

The resistance L must be so proportioned as to meet the requirements of lighting, and it is in practice found best to make it of such an amount as to prevent any current from passing through that battery which for the time being is connected direct to the lamps when the dynamo is making its maximum current, because any current passing through the aforesaid battery would cause its voltage to be raised, and consequently also that of the lamp-circuit connected thereto.

The regulating-switch Q may be placed inside or outside the car or coach.

Supplementary batteries to afford additional storage may be provided, if required.

When the apparatus is used on vehicles which run long distances without reversing their direction of motion—for instance, on cars used on circular railways or belt-lines or on cars making long journeys in one direction—the contact and switching devices are so constructed and arranged that the battery connections are alternated every time the dynamo stops and starts, whether the rotation of the dynamo and the direction of the current are reversed or not. A mechanism of this kind is represented in Figs. 6, 7, and 8. Referring to these figures it will be seen that we employ a double-armed or seesaw commutator or switch-lever $S^4$, operated by the motion of the contact-lever A, previously described with reference to Figs. 1 to 4. The said contact-lever A (see Fig. 7) is provided with a lug or bracket $A^4$, and this latter has mounted thereon a double-armed actuating-lever $A^5$, which is normally kept in position by a spring $A^6$ and has a small antifriction-roller $A^7$. The lever $A^5$ is pivoted in such a manner as to serve as a ratchet-pawl, so that it positively transmits the motion of the contact-arm A toward the switch-board K to one or the other of the star-wheels T T' as the arm is forced along the shaft W' by the centrifugal force of the governor. When, however, the contact-arm A returns to its normal position by means of the spring O during a stoppage, the pivoted roller $A^7$ will "give" to the teeth of a star-wheel T or T' and thus comes back to its original position. The star-wheels T T' are respectively mounted at each end of a spindle $T^2$, which has also mounted thereon a bevel-wheel $T^3$, which gears with a smaller bevel-wheel $T^4$, mounted on a short shaft $T^5$, having a crank $T^6$. Both the spindle $T^2$ and the short shaft $T^5$ are mounted in suitable bearings on the board K and the crank $T^6$ takes into a slot $S^5$ in the commutator or rocking switch-lever $S^4$. The rocking lever $S^4$ carries four contact-plates $S^6$, $S^7$, $S^8$, and $S^9$, which are respectively inserted into the contacts $d'$ $d^2$ $d^3$ $d^4$ or contacts $e'$ $e^2$ $e^3$ $e^4$. Each pair of contact-plates is insulated from the other three pairs and the contact-plates $S^6$ serve to connect contact $d'$ to contact $d^2$, the contact-plates $S^7$ serve to connect contact $d^3$ to $d^4$, or contact-plates $S^8$ serve to connect contacts $e'$ to $e^2$, and contact-plates $S^9$ serve to connect contacts $e^3$ and $e^4$. On Fig. 8 the contact-plates $S^8$ and $S^9$ of the rocking lever $S^4$ are shown as connecting the contacts $e'$, $e^2$, $e^3$, and $e^4$, respectively. The current will flow from the dynamo to the contact $e^4$, then through the contact-plates $S^9$ to contact $e^3$, where it divides, a portion passing through the resistance L to the contact $d'$, thence to the contact $e^2$ through the contact-plates $S^8$ to the contact $e'$, and thence to the lamps. It will be observed that the battery M' is joined in parallel with the lamps at contact $d'$. The remainder of the current will pass from the contact-plate $e^3$ through the battery M and charges it. Similarly when the dynamo stops and restarts (in either direction) the rocking lever $S^4$ will be carried over and contact-plates $S^6$ and $S^7$ will be inserted between the contacts $d'$, $d^2$, $d^3$, and $d^4$, thus causing the battery M' to be charged, the lamps being supplied by current from the dynamo through the resistance, the battery M being put in parallel with the lamps.

As before described, it is evident that the resistance L is so proportioned that when the dynamo is making the maximum amount of current only sufficient current passes through the resistance to supply the lamps.

Instead of a rocking or seesaw commutator or switch, as last described, we can employ for the same purpose an intermittently-rotating commutator, which is represented in Figs. 9, 10, 11, and 12. This commutator or switch $S^{10}$ is actuated by means of two star-wheels T T', one of which is fixed at each end of the shaft $T^2$, carrying the commutator and mounted in suitable brackets on the board K. As described and as shown in Fig. 7, the contact-lever A is provided with a lug or bracket $A^4$, and this latter has mounted thereon a double-armed lever $A^5$, which is normally kept in position by a spring $A^6$ and has a small roller $A^7$, but we have not deemed it necessary to show the parts again. It will therefore be apparent that the commutator is operated by the same kind of mechanism as before described and that it does not rock, but is moved through a definite angle each time the train is stopped; or instead of two star-wheels T T', one star-wheel may be used, mounted centrally on the spindle $T^2$, and two brackets $A^4$ (see Fig. 7) on the rocking arm, one of these brackets corresponding to one position of the contact-lever A and the other bracket corresponding to the other position of the lever A in such manner that either one or the other of these brackets operates the commutator star-wheel.

There are four contacts, which are connected as follows: $d^5$ is connected to the positive terminal of battery M', $d^6$ is connected to contacts $a$ and $a'$, $e^5$ is connected to the positive terminal or battery M and to contact 3 of resistance-switch E E², and $e^6$ is connected to the lamps. On the commutator $S^{10}$ we provide two sets of four segments $s'$, $s^2$, $s^3$, and $s^4$ and $s^5$, $s^6$, $s^7$, and $s^8$. In each set two directly opposite are connected together. Thus $s'$ is connected to $s^3$ and $s^5$ is connected to $s^7$, and the remaining contacts $s^2$, $s^4$, $s^6$, and $s^8$ are connected diagonally as follows: $s^2$ is connected to $s^8$ and $s^4$ is connected to $s^6$. The distribution of the current will consequently be as follows: Supposing the case in which the commutator $S^{10}$ is in such a position that the fixed contacts $d^5$, $d^6$, $e^5$, and $e^6$ are connected directly to one another, the current will flow from the dynamo from contact $a$ or contact $a'$, according to the direction of rotation of the dynamo, (see also diagram Fig. 12,) to contact $d^6$, through the pair of segments $s'$ and $s^3$ to contact $d^5$, and thence to the positive terminal of battery M, which it will charge. The current will also flow from the positive terminal of battery M to contact $e^5$, through the segments $s^5$ and $s^7$ to the contact $e^6$, and thence to the lamps, discharging battery M. At the next stoppage of the train the commutator will be carried around a quarter of a revolution by the roller $A^7$, (see Fig. 7,) attached to the contact-lever A, acting on the star-wheel T, as above described, until, as shown in the diagram Fig. 11, the contact $d^5$ is pressing on the segment $s^4$, $d^6$ on $s^2$, $e^5$ on $s^8$, and $e^6$ on $s^6$. The current will flow from the dynamo from contact $a$ or $a'$, Fig. 9, according to the direction of rotation of the dynamo, to contact $d^6$, through $s^2$ and diagonally to $s^8$, and from $e^5$ to the positive terminal of battery M, which it will charge. The current will also flow from the positive terminal of battery M' to the contact $d^5$, segments $s^4$ and $s^6$ to contact $e^6$, and from thence to the lamps, discharging battery M'.

If desired, the resistance L may be dispensed with altogether, and in that case one battery will be charged while the other is discharged through the lamps.

We claim as our invention—

1. The combination with a dynamo, two storage batteries, a charging-circuit and a service-circuit, and connections between said circuits and batteries, of a contact-lever which is automatically moved into contact by the starting of the dynamo and out of contact by the stoppage of the dynamo and a switch for alternating the connections between the storage batteries and the charging and service circuits, which switch is automatically shifted by said contact-lever upon the stopping and starting of the dynamo, substantially as set forth.

2. The combination with a dynamo, two storage batteries, a charging-circuit and a service-circuit, and connections between said circuits and said batteries, of a contact-lever, a centrifugal governor by which said lever is moved into contact upon the starting of the dynamo, a spring whereby said lever is moved out of contact upon the stopping of the dynamo, and a switch for alternating the connections between the storage batteries and the charging and service circuits, which switch is automatically shifted by said contact-lever upon the stopping and starting of the dynamo, substantially as set forth.

3. The combination with a dynamo, two storage batteries, a charging-circuit and a service-circuit, and connections between said circuits and batteries, of a reversible contact-lever which is automatically reversed when the dynamo reverses its motion and which reverses the current, a switch for alternating the connections between the storage batteries and the charging and service circuits, and means whereby said switch is automatically shifted when said contact-lever is reversed, whereby the reversal of the rotation of the dynamo causes the reversal of the current and the switching of the battery last charged to the service-circuit and of the battery last in service to the charging-circuit, substantially as set forth.

4. The combination with a dynamo, two storage batteries, a charging-circuit and a service-circuit, and connections between said circuits and said batteries, of a reversible contact-lever which is automatically reversed and moved into contact by the reversal of the rotation of the dynamo and which is provided with an actuating-arm, and a rocking switch-lever for alternating the connections between the storage batteries and the charging and service circuits and which is automatically shifted by said actuating-arm as the contact-lever is moved into contact, substantially as set forth.

5. The combination with a dynamo, two storage batteries, a charging-circuit and a service-circuit, and connections between said circuits and said batteries, of a reversible contact-lever capable of rocking and of lengthwise movement on the dynamo-shaft and provided with an actuating-arm, a centrifugal governor whereby said lever is moved lengthwise on said shaft and into contact, a spring whereby said lever is moved in the opposite direction, and a rocking switch-lever for alternating the connections between the storage batteries and the charging and service circuits and which is automatically shifted by said actuating-arm as the contact-lever is moved into contact, substantially as set forth.

EDWIN JAMES PRESTON.
ARTHUR BERNARD GILL.

Witnesses:
   W. M. HARRIS,
   GEO. M. FRANKLIN.